July 18, 1933.  A. W. F. GUEST  1,919,104
FISHLINE REEL
Filed May 21, 1931
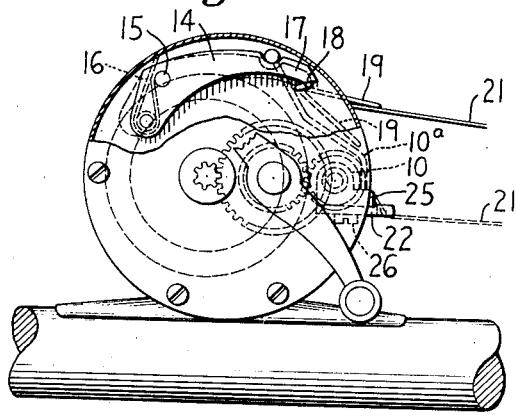
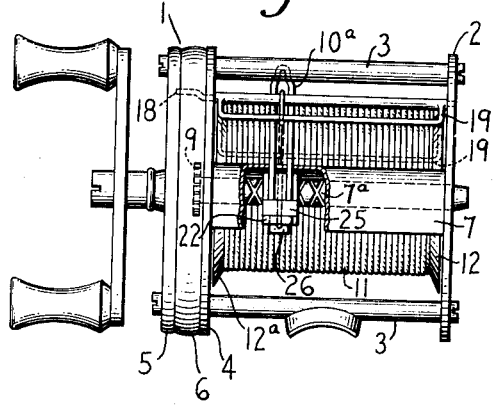
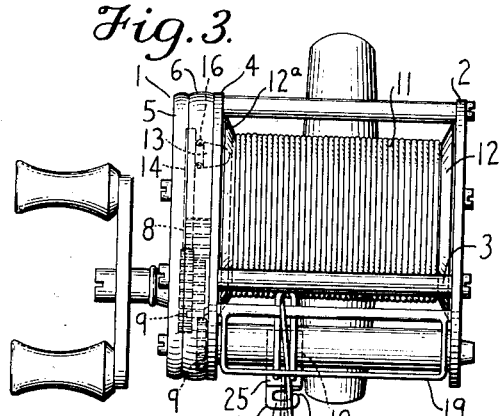
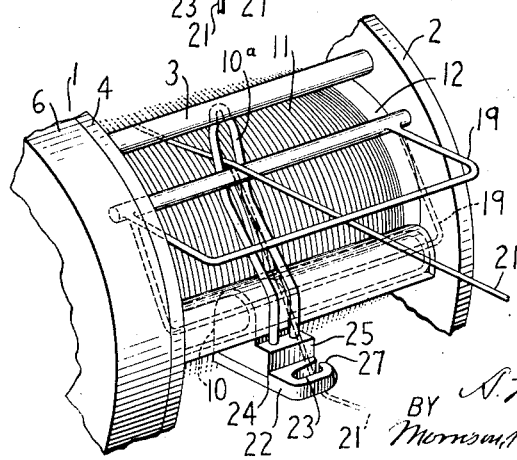
INVENTOR
A. W. F. Guest
BY Morrison, Kennedy & Campbell
ATTORNEYS.

Patented July 18, 1933

1,919,104

UNITED STATES PATENT OFFICE

ALFRED W. F. GUEST, OF BROOKLYN, NEW YORK

FISHLINE REEL

Application filed May 21, 1931. Serial No. 538,897.

This invention relates to fishing reels, and more particularly to fishing reels of the level-winding anti-back-lash type, wherein the fish line passes through a guide reciprocable horizontally across the reel in front of a spool on which the line is wound. The fish line runs from the spool through the winding guide and beneath a bail located in front of the guide and journalled in the frame of the reel. One of the journalled ends of the bail is extended within the head of the reel to engage a brake device pivotally mounted therein on the frame of the reel, and normally applying a braking action to the spool. The bail, held in a lowered position by the brake device, is adapted to be raised by the fish line when the latter is rendered taut, thereby releasing the brake and permitting the spool to rotate freely. In casting with this reel, the bait or casting plug puts the fish line under tension, but at the end of the cast the line slackens, thus allowing the bail to fall to its normal lowered position and permitting the brake automatically to apply a braking action to the spool to prevent the rapidly rotating spool from back-winding the fish line.

To the ends stated, the reel fulfills its office admirably. However, when a fish strikes and begins to run with the line, the latter is again brought under tension and the bail raised, automatically releasing the brake at the very time when a brake is necessary. It has been customary heretofore to check the free running of the fish by applying pressure with the thumb to the rotating spool, but this practice is not always satisfactory or effective, since a fast-running fish or a heavy fish cannot easily be controlled in such simple fashion.

The object of the present invention is to overcome the foregoing and other objectionable features, and it therefore contemplates selectively controlled means to prevent, when desired, the actuation of the brake releasing device even when the line is under tension. More specifically, the invention provides a guide formed integrally with or connected to the base of the winding guide and through which the fish line may be directed at will in order to hold it from engaging and actuating the brake releasing bail.

The invention illustrated in the accompanying drawing is shown merely by way of example and in preferred form, and obviously many modifications and variations may be made therein which will still be comprised within its spirit. It is to be understood, therefore, that the invention is not to be limited except in so far as such limitations are specified in the appended claims.

Referring to the drawing:

Fig. 1 is a side elevation of the reel, partly broken away, showing by the full lines the brake member held released by the bail, and showing by the dotted lines the brake in active position, the tensioned fish line passing through the guide which prevents it from engaging the brake releasing bail;

Fig. 2 is a front elevation of the reel, partly broken away to show the winding guide mechanism;

Fig. 3 is a top detail view showing the arrangement of the various parts of the brake system; and Fig. 4 is a fragmentary perspective view of the reel showing the improvement embodied therein.

The frame of the reel comprises a head member 1 and a tail plate 2, connected and spaced by suitable pillars 3. The head member 1 is made up of inner and outer plates 4 and 5 respectively, the latter having a peripheral flange 6 abutting the inner plate and thereby spacing the two to provide a chamber. In this type of reel, the winding mechanism 7 comprises a shaft $7^a$, having two screw threads with double pitch, and being actuated by a main gear 8 through the gear wheels 9. Cooperating with the threaded shaft is a follower 10, and a line guide $10^a$, mounted thereon, is adapted to be reciprocated thereby horizontally across the reel in front of a spool 11, so as to distribute the fish line thereon and produce the so-called level winding.

The side flanges 12 and $12^a$ of the winding spool 11 are outwardly concave, and the periphery of the flange $12^a$, which is adjacent the head member 1, is bevelled to provide a braking surface. Adapted to engage with the bevelled surface of the flange 12ª, to apply a braking action to the spool, is a brake shoe 13, extending laterally through an opening in the plate 4 from one end of a brake member 14, which is pivotally attached at 15 to the outer head plate 5. To hold the brake shoe normally in active position against the spool flange 12ª, there is provided a wire spring 16, looped round the brake shoe and the pivot 15 and put under tension by having its free end forced under the peripheral flange 6. This brake member 14 is disposed so that it projects rearwardly above and beyond the axis of the spool (as shown in Fig. 1), the forward end 17 of the member lying above and in engagement with the extension 18 of the bail 19. When the fish line 21 is slack, the bail 19 is held by the brake member 14 in the downward position shown by the dotted lines in the various figures, and the brake shoe 13 is in engagement with and applies a braking action to the spool flange 12ª. When, however, the fish line 21 is held taut, the bail 19 is raised to the upper position as shown by the full lines (see Figs. 1 and 4) and the brake is held released by the extension 18.

The structure thus far described is or may be the same as level-winding anti-back-lash fishing reels in commercial use, and hence no further description is necessary.

In carrying out the present invention, there is provided a guide 22 which, when the line is passed therethrough, prevents it from engaging and actuating the brake releasing bail 19. In the form shown, the guide 22 has a slot 23 opening at one side thereof, and the forward slotted end of said guide is raised slightly so as to provide a shoulder 24 which will abut and aline with the forward edge of the base 25 of the follower 10, thus permitting the guide 22 to be rigidly secured thereto by a single screw 26.

With this simple attachment, when a fish strikes and starts to run, the fish line can be directed very readily into the slot 23, and is prevented from slipping therefrom by the portion 27 of the guide which partially closes the slot opening. Thus, the line is directed downward immediately in front of the spool and is prevented from actuating the bail 19. In order to release the brake for retrieving, the bail may be raised and lowered at will by a finger without dislodging the line from the guide 22.

The manner of attachment, as above described, permits the improved device to be substituted for a thin retaining plate, the latter being fastened in place by a single screw. Hence the only requisite for the substitution is a slightly longer screw, and thus the improvement may be readily attached to reels now in use as well as embodied in new reels.

Having thus described my invention, what I claim is:

1. In a fish line reel, the combination of a frame, a spool rotatably mounted in the frame, a brake member secured to the frame and adapted to apply a braking action to the spool, a device adapted to be actuated by the fish line when the latter is under tension to automatically release the brake, and a hook guide on the reel adapted to engage the line when desired to prevent its actuation of said device to release the brake.

2. In a fish line reel, the combination of a frame, a spool rotatably mounted in the frame, a brake member secured to the frame and adapted to apply a braking action to the spool, a movable bail member adapted to be raised by the fish line to release the brake member when said line is under tension, a line winding guide mechanism movable horizontally across the front of the reel and through which the line passes, and a hook guide secured to the base of the winding guide mechanism and movable therewith, through which guide the line may be passed so as to prevent it from engaging and moving the bail to release the brake.

3. In a fish line reel, the combination of a frame, a spool rotatably mounted in the frame, a brake member secured to the frame and adapted to apply a braking action to the spool, a bail member on the reel adapted to be actuated to release the brake by the tensioning of the line, and a line guide on the reel with which the line is adapted to be engaged and disengaged at will, said guide being arranged on the reel so that when the line is engaged therewith it is prevented from actuating the brake releasing bail member when under tension.

4. In a fish line reel, the combination of a frame, a spool rotatably mounted in the frame, a brake member secured to the frame and adapted to apply a braking action to the spool, a bail member on the reel adapted to be actuated to release the brake by the tensioning of the line, and a line guide on the reel through which the line may be passed, said guide being formed so that the line may be engaged therewith and disengaged therefrom at will, and being arranged on the reel so that when the line is engaged therewith and under tension it is prevented from actuating the brake releasing bail member.

ALFRED W. F. GUEST.